United States Patent
Zirwas et al.

(10) Patent No.: US 12,381,762 B2
(45) Date of Patent: Aug. 5, 2025

(54) CHANNEL ESTIMATION USING MACHINE LEARNING

(71) Applicant: Nokia Technologies Oy, Espoo (FI)

(72) Inventors: Wolfgang Zirwas, Munich (DE); Brenda Vilas Boas, Neubiberg (DE); Zexian Li, Espoo (FI); Amir Mehdi Ahmadian Tehrani, Munich (DE); Oana-Elena Barbu, Aalborg (DK)

(73) Assignee: Nokia Technologies Oy, Espoo (FI)

( * ) Notice: Subject to any disclaimer, the term of this patent is extended or adjusted under 35 U.S.C. 154(b) by 34 days.

(21) Appl. No.: 18/267,138

(22) PCT Filed: Dec. 9, 2021

(86) PCT No.: PCT/EP2021/085111
§ 371 (c)(1),
(2) Date: Jun. 14, 2023

(87) PCT Pub. No.: WO2022/128755
PCT Pub. Date: Jun. 23, 2022

(65) Prior Publication Data
US 2024/0056336 A1 Feb. 15, 2024

(30) Foreign Application Priority Data
Dec. 18, 2020 (FI) .................................. 20206339

(51) Int. Cl.
*H04L 27/22* (2006.01)
*H04L 25/02* (2006.01)
(52) U.S. Cl.
CPC ...... *H04L 25/0254* (2013.01); *H04L 25/0204* (2013.01)

(58) Field of Classification Search
CPC . H04L 27/22; H04L 27/2332; H04L 25/0242; H04L 25/0254; G06K 7/0008;
(Continued)

(56) References Cited

U.S. PATENT DOCUMENTS

| | | | |
|---|---|---|---|
| 2022/0393781 A1* | 12/2022 | Kim | H04W 8/02 |
| 2023/0254837 A1* | 8/2023 | Raghavan | H04W 72/046 370/329 |
| 2024/0056336 A1* | 2/2024 | Zirwas | H04L 25/0204 |

OTHER PUBLICATIONS

Gao, S. et al., "Deep Learning Based Channel Estimation for Massive MIMO with Mixed-Resolution ADCs," IEEE Communications Letters, vol. 23, No. 11, Nov. 1, 2019, pp. 1989-1993.
(Continued)

*Primary Examiner* — Khai Tran
(74) *Attorney, Agent, or Firm* — Nokia Technologies Oy (57) ABSTRACT

A method for performing multiple-input and multiple-output channel estimation includes: generating, using a first machine-learning model, an initial set of estimated channel information from a first input set of channel information, wherein the first input set of channel information corresponds to a first plurality of radio-frequency chains, and wherein the estimated set of channel information corresponds to the first plurality of radio-frequency chains and a second plurality of radio-frequency chains; generating, using a second machine-learning model, a set of estimated channel phases from the initial set of estimated channel information and a second input set of channel information, wherein the second set of input channel information corresponds to the second plurality of radio-frequency chains; and combining the initial set of estimated channel information and the set of estimated channel phases to generate an enhanced set of estimated channel information.

12 Claims, 8 Drawing Sheets

(58) Field of Classification Search
CPC ...... G06K 7/10009; G06N 3/08; G06N 20/00; H04B 17/3913; H04B 7/373
USPC .......................................................... 375/329
See application file for complete search history.

(56) References Cited

OTHER PUBLICATIONS

Dong, Y. et al., "Channel Estimation for One-Bit Multiuser Massive MIMO Using Conditional GAN," arXiv.org, Oct. 29, 2020.
Boas, B. Vilas et al., "Two-step Machine Learning Approach for Channel Estimation with Mixed Resolutions RF Chains," arXiv.org, Jan. 24, 2021.

* cited by examiner

| Block | $N_{filter}$ | Stride | BatchNorm | Activation |
|---|---|---|---|---|
| downsample | 64 | [1,1] | No | - |
| downsample | 128 | [5,1] | Yes | - |
| downsample | 128 | [5,1] | Yes | - |
| downsample | 128 | [3,1] | Yes | - |
| downsample | 128 | [2,1] | Yes | - |
| Zero padding 2D | - | - | - | - |
| Conv2D | 256 | [1,1] | Yes | LeakyReLU |
| Zero padding 2D | - | - | - | - |
| Conv2D | 64 | [5,1] | Yes | Linear |

FIG. 8

| $j$ | Block | $N_{filter}$ | Stride | BatchNorm | Dropout |
|---|---|---|---|---|---|
| 1 | downsample | 32 | [1,1] | No | No |
| 2 | downsample | 64 | [2,2] | Yes | No |
| 3 | downsample | 64 | [2,2] | Yes | No |
| 4 | downsample | 64 | [2,2] | Yes | No |
| 5 | downsample | 64 | [5,1] | Yes | No |
| 6 | downsample | 64 | [6,1] | Yes | No |
| 7 | downsample | 128 | [6,1] | Yes | No |
| 8 | upsample | 128 | [5,1] | Yes | Yes |
| 9 | upsample | 64 | [5,1] | Yes | Yes |
| 10 | upsample | 64 | [5,1] | Yes | Yes |
| 11 | upsample | 64 | [2,2] | Yes | No |
| 12 | upsample | 128 | [2,2] | Yes | No |
| 13 | upsample | 64 | [2,2] | Yes | No |
| 14 | upsample | 32 | [1,1] | Yes | No |

CHANNEL ESTIMATION USING MACHINE LEARNING

CROSS REFERENCE TO RELATED APPLICATION

This patent application is a U.S. National Stage application of International Patent Application Number PCT/EP2021/085111 filed Dec. 9, 2021, which is hereby incorporated by reference in its entirety, and claims priority to FI 20206339 filed Dec. 18, 2020.

FIELD

This specification describes systems and methods for performing multiple-input and multiple-output (MIMO) channel estimation using machine learning.

BACKGROUND

The use of constrained radio frequency (RF) frontends has been proposed, as well as novel pre-coders, i.e., multi-antenna, greedy, iterative and quantized precoding algorithm (MAGIQ), to reduce cost, size and power consumption of base stations. Nevertheless, the best performance of MAGIQ assumes accurate channel knowledge per antenna element, for example, from uplink sounding reference signals.

SUMMARY

According to a first aspect of this specification, there is described a method comprising: generating, using a first machine-learning model, an initial set of estimated channel information from a first input set of channel information. The first input set of channel information corresponds to a first plurality of radio-frequency chains, and the estimated set of channel information corresponds to the first plurality of radio-frequency chains and a second plurality of radio-frequency chains. The method further comprises generating, using a second machine-learning model, a set of estimated channel phases from the initial set of estimated channel information and a second input set of channel information. The second set of input channel information corresponds to the second plurality of radio-frequency chains. The method further comprises combining the initial set of estimated channel information and the set of estimated channel phases to generate an enhanced set of estimated channel information. The enhanced set of estimated channel information corresponds to the first plurality of radio-frequency chains and the second plurality of radio-frequency chains.

For hybrid RF systems one RF chain might map to one beam having an analogous phase shifter network for beamforming.

The first plurality of radio frequency chains may comprise a plurality of high-resolution radio frequency chains. The second plurality of radio frequency chains may comprise a plurality of low-resolution radio frequency chains.

The first machine-learning model may be a neural network comprising one or more convolutional layers. The first machine-learning model may comprise a plurality of down-sampling blocks followed by a plurality of up-sampling blocks. The first machine-learning model may comprise one or more skip-connections, each skip connection being between a down-sampling block and a corresponding up-sampling block.

The second machine-learning model may be a long short-term memory model. The initial set of estimated channel information may be converted to time domain information prior to input into the long short-term memory model.

The second input set of channel information may comprise estimated phases corresponding to the second plurality of radio-frequency chains. Generating the set of estimated channel phases may comprise: determining further phase information from the initial set of estimated channel information; and inputting the estimated phases corresponding to the second plurality of radio-frequency chains and the further phase information to the second machine-learning model.

Combining the initial set of estimated channel information and the set of estimated channel phases to generate an enhanced set of estimated channel information may comprise: combining each estimated channel phase with an absolute value of a corresponding element of the initial set of estimated channel information.

The method may further comprise: determining an additional set of channel information from the initial set of estimated channel information and the second input set of channel information using an alternative channel estimation method; receiving further channel information corresponding to a measurement of an antenna element associated with a constrained-resolution radio-frequency chain, wherein the further channel information has been measured using a high-resolution radio-frequency chain; determining a first error value, the first error value comparing the further channel information to a corresponding element of channel information in the enhanced set of estimated channel information; determining a second error value, the second error value comparing the further channel information to a corresponding element of channel information in the additional set of channel information; and if the first error is lower than the second error, outputting the enhanced set of estimated channel information.

According to a further aspect of this specification, there is described a method comprising: generating, using a generator machine-learning model, a set of estimated channel information from a first input set of channel information. The first input set of channel information corresponds to a first plurality of radio-frequency chains, and the estimated set of channel information corresponds to the first plurality of radio-frequency chains and a second plurality of radio-frequency chains. The method further comprises determining, using a discriminator machine-leaning model, a first classification using the set of estimated channel information and the first input set of channel information. The method further comprises determining, using the discriminator machine-leaning model, a second classification using a further input set of channel information and a corresponding ground-truth set of channel information. The further input set of channel information corresponds to the first plurality of radio-frequency chains, and the corresponding ground-truth set of channel information corresponds to the first plurality of radio-frequency chains and the second plurality of radio-frequency chains. The method further comprises updating parameters of the generator machine-leaning model based on the first classification using a generator objective function; and updating parameters of the discriminator machine-leaning model based on the first classification and the second classification using a discriminator objective function.

The first plurality of radio frequency chains may comprise a plurality of high-resolution radio frequency chains, and the second plurality of radio frequency chains may comprise a plurality of low-resolution radio frequency chains.

The generator machine-leaning model may comprise a convolutional neural network comprising a plurality of down-sampling layers followed by a plurality of up-sampling layers. The discriminator neural network may comprise a convolutional neural network comprising a plurality of down-sampling layers.

According to a further aspect of this specification, there is described a base station comprising: a plurality of high-resolution radio frequency chains; a plurality of low-resolution radio frequency chains; one or more processors; and a memory, the memory comprising computer readable instructions that, when executed by the one or more processors, causes the base station to perform any one or more of the channel estimation methods described herein.

According to a further aspect of this specification, there is described a system comprising one or more processors and a memory, the memory comprising computer readable instructions that, when executed by the one or more processors, causes the system to perform any one or more of the methods described herein.

According to a further aspect of this specification, there is described a computer program product comprising computer-readable code that, when executed by a computing device, causes the computing device to perform any one or more of the methods described herein.

BRIEF DESCRIPTION OF THE DRAWINGS

Example embodiments will now be described by way of non-limiting example, with reference to the accompanying drawings, in which.

DETAILED DESCRIPTION

This specification describes an efficient uplink channel estimator that uses machine-learning algorithms. A two-step machine-learning approach is described. First, a first machine-learning model predicts radio channels from a limited set of full-resolution radio frequency (RF) chains to the rest of the low-resolution RF chain antenna elements. Subsequently, a second machine-learning model extracts further phase information from the low-resolution RF chain antenna elements. This information is combined to produce a channel estimate. In some embodiments, conditional generative adversarial networks (cGANs) are used as the first machine-learning model and long-short term memory (LSTM) neural networks (NN) are used as the second machine-learning model.

The systems and methods described herein can provide accurate channel estimates in mixed-resolution systems. In particular, the systems and methods described herein can provide accurate channel estimates in scenarios with closely spaced multi-path components.

Figure 1:
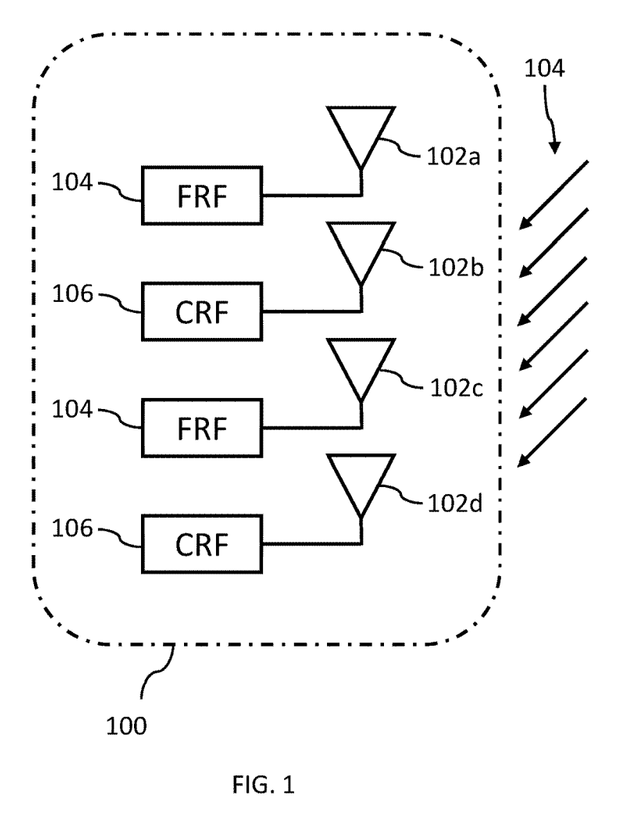
FIG. 1 shows a schematic overview of a base station.

FIG. 1 shows a schematic overview of a base station 100. The base station comprises a plurality of antenna elements 102a-d for receiving and/or transmitting RF signals 104. Each antenna element 102a-d is connected to a RF chain 104, 106 configured to process signals received at the corresponding antenna 102a-d. The base station 100 comprises a first plurality of antenna elements 102a, 102c (in this example two antennas, though in general any number of antennas may form the first plurality of antennas). The first plurality of antenna elements 102a, 102c may be connected to high-resolution RF chains 104 (also referred to herein as "full-resolution RF chains"). The base station 100 further comprises a second plurality of antenna elements 102b, 102d (in this example two antennas, though in general any number of antennas may form the second plurality of antennas). The second plurality of antenna elements 102b, 102d may be connected to low-resolution RF chains 106 (also referred to herein as "constrained-resolution RF chains"). The base station 100 thus has a mixed-resolution RF antenna array.

In the following description, it is assumed that the first plurality of antenna elements 102a, 102c is connected to high-resolution RF chains 104 and the second plurality of antenna elements 102b, 102d is connected to low-resolution RF chains 106. However, it will be appreciated that in some embodiments the first and second plurality of antenna elements may be connected to RF chains of the same resolution, or that each may contain both low-resolution and high-resolution RF chains.

Figure 2A:
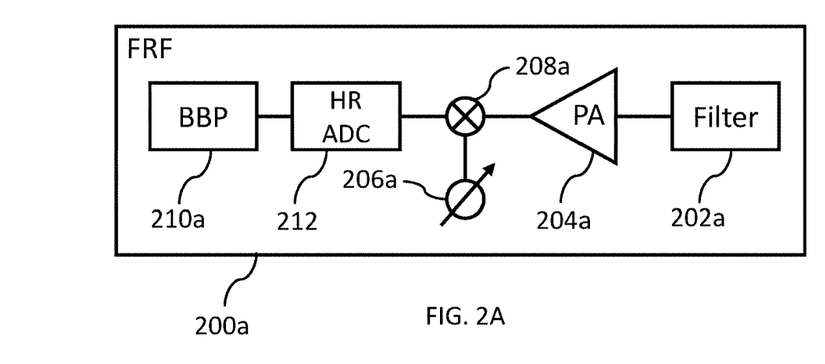
FIG. 2A shows a schematic overview of an example of a full-resolution radio-frequency chain.
Figure 2B:
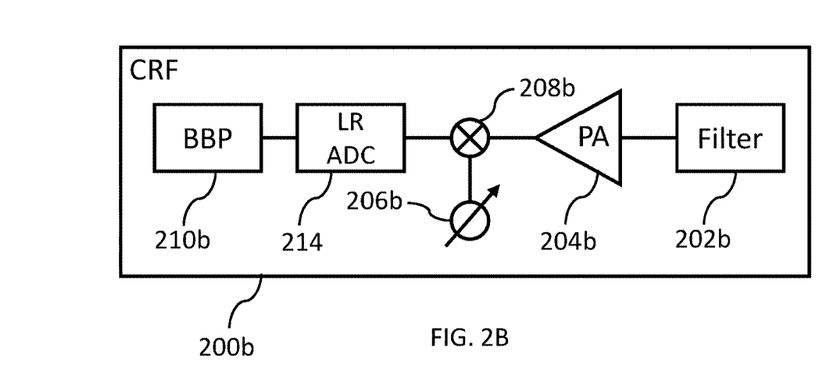
FIG. 2B shows a schematic overview of an example of a full-resolution radio-frequency chain.

FIGS. 2A and 2B show schematic examples of a full-resolution RF chain 200a and a constrained-resolution RF chain 200b respectively. Both types of RF chain comprise a filter 202a, 202b, a power amplifier 204a, 204b, a local oscillator 206a, 206b, a mixer 208a, 208b and a baseband processing unit 210a, 210b.

A full-resolution RF chain 200a additionally comprises a high-resolution analogue-to-digital converter 212 (ADC). The constrained-resolution RF chain 200b additionally comprises a low-resolution ADC 214, for example a 1-bit ADC. The resolution of an ADC corresponds to the number of different digital/binary values it can output given the allowed input analogue values. For example, a 1-bit ADC can output one of two values (e.g. 0 or 1) depending on the input analogue signal, while a 3-bit ADC can output one of eight values (e.g. 000, 001, 010, 011, 100, 101, 110, 111) depending on the input analogue signal. In general, a high-resolution ADC will have more potential outputs than a low-resolution ADC.

Signals received at an antenna pass to the filter 202a, 202b of the corresponding RF chain 200a, 200b for analogue filtering. The filtered signal then undergoes power-amplification in the power amplifier 204a, 204b of the RF chain. The local oscillator 206a, 206b generates RF carrier frequency signal, which is combined with the amplified signal by the mixer 208a, 208b. The mixed and down converted signal is input to the ADC 212, 214 for conversion from an analogue signal to a digital signal. The digital signal is then passed to a baseband processor 210a, 210b for further processing.

Figure 3:
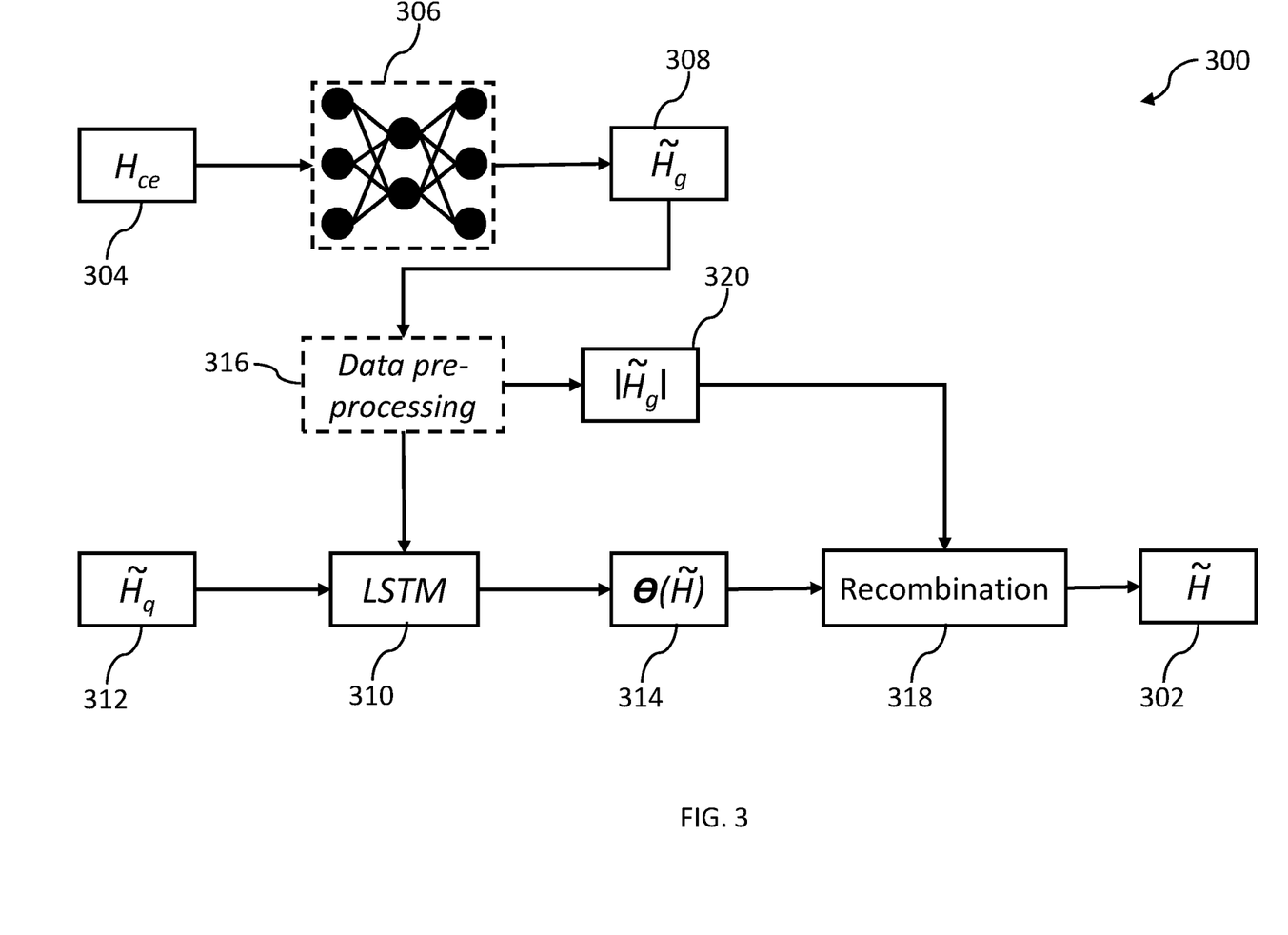
FIG. 3 shows an overview of an example method of channel estimation for a mixed-resolution system.

FIG. 3 shows an overview of an example method 300 of channel estimation for a mixed-resolution system, such as the system described in FIGS. 1, 2A and 2B. The method 300 may be performed by a computing system. The aim of the method is to estimate a set of channel information 302, H, for the system. The channel information may be represented as a complex matrix, $H \in \mathbb{C}^{M \times N_{sub}}$, where M is the total number of antenna elements in the antenna array of the mixed-resolution system and $N_{sub}$ is the number of subcarriers in a received signal.

A channel in each sub-carrier, h(n), may be modelled as:

$$h(n) = \sum_{i=1}^{L} \alpha_i e^{-j2\pi \frac{(n-1)}{N_{sub}} \tau_i} a_F(\theta_i, d, M), \quad (1)$$

where L is the number of multi-path components (MPCs), and τ is a delay, α is a complex amplitude, and θ is a direction of arrival (e.g. angle of arrival) of each MPC. The vector $a_F$ is a steering vector of the antenna array with M antennas placed with a relative distance d between two adjacent antenna elements.

A first set of channel information 304 (also referred to herein as the "first input set of channel information") is obtained from a set of RF signals received at an antenna array. The first set of channel information 304 corresponds to (e.g. is derived from) measurements from a plurality of high-resolution RF chains. The first set of channel information 304 may be represented as a complex matrix, denoted $H_{ce} \in \mathbb{C}^{M \times N_{sub}}$. Rows of this matrix corresponding to high-resolution RF chains contain information derived from the signals received by antenna elements corresponding to those high-resolution RF chains. Rows of this matrix corresponding to low-resolution RF chains are set to zero, i.e. information from the low-resolution RF chains is essentially ignored at this stage of the method.

The first set of channel information 304 is input into a first machine-learning model 306. The first machine-learning model 306 processes the first set of channel information 304 to generate an initial set of estimated channel information 308, $\check{H}_g \in \mathbb{C}^{M \times N_{sub}}$ (also referred to herein as the "predicted channel information"). The initial set of estimated channel information 308 comprises estimated channel information corresponding to both the high-resolution RF chains and the low-resolution RF chains. In other words, the first machine-learning model estimates channel information for all channels of the mixed-resolution system from channel information corresponding to the high-resolution RF chains. Information from signals received at antenna elements corresponding to the low-resolution RF chains is essentially ignored.

The first machine-learning model 306 may be a neural network. The neural network may be a convolutional neural network, such as the network described in relation to FIG. 7. The neural network may comprise a U-shaped deep neural network, similar to an encoder-decoder architecture, comprising a plurality of down-sampling layers followed by a plurality of up-sampling layers. The neural network may comprise skip connections between blocks j and $N_b$-j, where j=[1: $N_b$], and $N_b$ is the total number of processing blocks. Those blocks interconnections provide more information to the decoder block. The first machine-learning model 306 may be a generator neural network from a generative adversarial network (GAN) training method, such as the method described in relation to FIG. 5.

In some embodiments, the first set of channel information 304 may be normalised by its Frobenius norm, and then multiplied by a scaling factor to increase the range value of the channel coefficients without changing their statistical distribution. Alternatively or additionally, the first set of channel information 304 may be split into real and imaginary components prior to input into the first machine-leaning model. Such a split may be represented as a three-dimensional array, $H_{ce} \in \mathbb{R}^{M \times N_{sub} \times 2}$.

A second machine learning model 310 uses a second set of channel information 312, $\hat{H}_q$, and information derived from the initial set of estimated channel information 308 to generate a set of estimated channel phases 314, Θ(H), for each channel in the mixed-resolution system. The second set of channel information 312 corresponds to (e.g. is derived from) measurements from a plurality of low-resolution RF chains. The second machine-learning model 310 may be a recurrent neural network, such as a long short-term memory network (LSTM).

The second set of channel information 312, $\hat{H}_q$, may correspond to phase information derived from the signals received at antenna elements corresponding to the low-resolution RF chains. This information may be in the time domain, and may be obtained by performing an inverse Fourier transformation on frequency domain signals received from the low-resolution RF chains.

In some embodiments, the low-resolution RF chains contain 1-bit ADCs, though it will be appreciated that the method can equally be applied to RF chains with a higher-resolution (though lower that the high-resolution RF chains).

As the 1-bit RF chains are cheaper, it is assumed that each of the M antenna elements can perform 1-bit measurements. Moreover, for those 1-bit measurements, it is assumed the user equipment (UE) sends the pilots mixed with a random sequence $S \in \mathbb{C}^{K \times 1}$, generated in the frequency domain with constant amplitude and random phase, where K<$N_{sub}$ is the size of the 1-bit measurement in the time domain. Due to the small number of MPCs and their clustering, the channel impulse response (CIR) for each M antenna element contains relevant power in a limited number of taps K. Moreover, the random sequence spreads the amplitude information within the measurement window which increases the useful information contained in the phase signal.

Prior to input into the second machine-learning model 310, the initial set of estimated channel information 308 may be pre-processed 316. The pre-processing 316 may comprise converting the initial set of estimated channel information 308 to the time domain, for example by performing an inverse Fourier transformation. The pre-processing 316 may alternatively or additionally comprise taking the phase value of the initial set of estimated channel information 308. For example, the input to the second machine-learning model 310 comprises the phases of the elements of $\check{H}_g$ in the time domain.

The estimated channel phases 314 are combined 318 with the initial set of estimated channel information 308 to generate the set of channel information 302, H, for the system (also referred to herein as "an enhanced set of estimated channel information"). Combining the estimated channel phases 314 with the initial set of estimated channel information 308 may comprise, for each channel, using the magnitude 320 of said channel from the initial set of estimated channel information 308 and the phase from the estimated channel phases 314.

In some embodiments, further pre-processing may be performed on the initial set of estimated channel information 308 and the second set of channel information 312 prior to input into the second machine-leaning model. One or more of the following data manipulations may be made: computation of the inverse Fourier transform, $\mathcal{F}^{-1}$, profiling computation, P, random sequence mixture, and/or quantisation (e.g. 1-bit quantisation), Q. This pre-processing may also be performed on the training data used for training the second machine-learning model, e.g. the ground-truth ("desired") channel information, H.

In some embodiments, full resolution CIRs, $\mathcal{H}_x \in \mathbb{C}^{M \times N_{sub}}$, are determined for the desired, noisy measurement and predicted signals, respectively, as $\mathcal{H} = \mathcal{F}^{-1}(H)$, $\mathcal{H}_z = \mathcal{F}^{-1}(H+Z)$, and $\mathcal{H}_g = \mathcal{F}^{-1}(\hat{H}_g)$, where Z is additive noise, e.g. white noise. A profiling version of each signal may then be calculated. The profiling version of the signal essentially oversamples the channel information. An example of such an operation is described in "Profiling of mobile radio channels" (W. Zirwas and M. Sternad, IEEE International Conference on Communications (ICC), 2020, pp. 1-7, the contents of which are incorporated herein by reference). The signal observation signal may be reduced to $K < N_{sub}$, such that $\mathcal{H}_x \in \mathbb{C}^{M \times K}$. The profiled signals may then be transferred to the frequency domain by the Fourier transform $\mathcal{F}$, and multiplied with the random sequence S mixed with the pilots by the UE. These may then be transformed back to the time domain, giving:

$$\hat{\mathcal{H}}_x = \mathcal{F}^{-1}\{\mathcal{F}\{P(\mathcal{H}_x)\}S\} \quad (2)$$

where x labels the signal of interest (i.e. noting for the desired signal, z for the noise measurement and g for the predicted signal).

Based on these transformations, the second set of channel information 312, $\hat{H}_q$, may be given by:

$$\hat{\mathcal{H}}_q = Q(\Re e\{\hat{\mathcal{H}}_z\}) + jQ(\Im m\{\hat{\mathcal{H}}_z\}). \quad (3)$$

The input to the second machine-learning model may comprise phases of the predicted channel information, $\mathcal{I}_1 = \Theta(\hat{\mathcal{H}}_g)$, and phases of the second set of channel information 312, $\mathcal{I}_2 = \Theta(\hat{\mathcal{H}}_q)$, where $\Theta$ is the angle operation and $\mathcal{I}_x \in \mathbb{R}^{K \times 1}$. When training the second machine-learning model, the label for each input is $\Theta(\hat{\mathcal{H}})$, the ground-truth phases.

Figure 4:
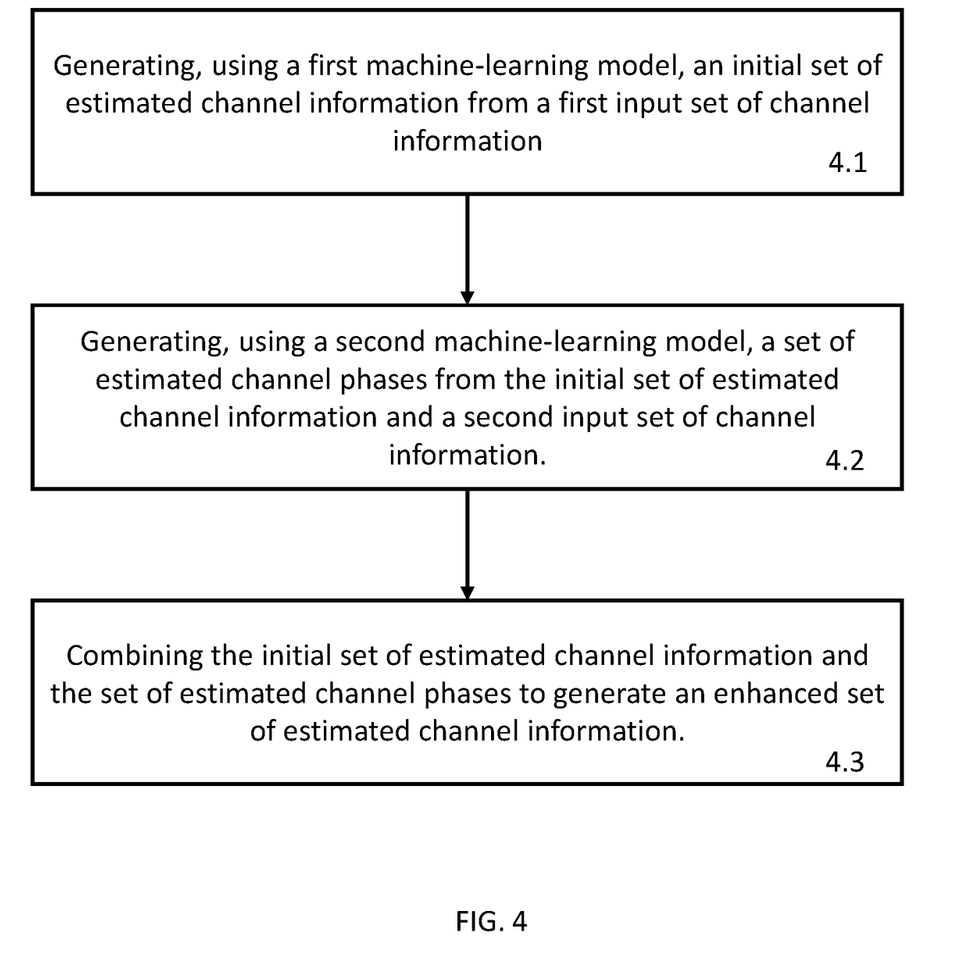
FIG. 4 shows a flow diagram of an example channel estimation method.

FIG. 4 shows a flow diagram of an example method of channel estimation for a mixed-resolution system. The method may be performed by a computer. The method may correspond to the method described in relation to FIG. 3.

At operation 4.1, a first machine-learning model is used to generate an initial set of estimated channel information from a first input set of channel information. The first input set of channel information corresponds to a plurality of high-resolution RF chains. The estimated set of channel information corresponds to the plurality of high-resolution RF chains and a plurality of low-resolution RF chains. In other words, an initial estimate of channel information for all chains in the mixed resolution system is predicted by the first machine-learning model from channel information corresponding to only the high-resolution RF chains.

At operation 4.2, a second machine-learning model is used to generate a set of estimated channel phases from the initial set of estimated channel information and a second input set of channel information. The second set of input channel information corresponds to the plurality of low-resolution RF chains. The second input set of channel information may be phase information derived from signals processed by the low-resolution RF chains.

The initial set of estimated channel information may be converted to time domain information prior to input into the long short-term memory model, for example by performing an inverse Fourier transformation.

At operation 4.3, the initial set of estimated channel information and the set of estimated channel phases are combined to generate an enhanced set of estimated channel information. The enhanced set of estimated channel information corresponds to the plurality of high-resolution RF chains and the plurality of low-resolution RF chains, i.e. it represents an improved estimate of channel information for all chains in the mixed resolution system that incorporates information from both the high-resolution RF chains and the low-resolution RF chains.

Combining the initial set of estimated channel information and the set of estimated channel phases may comprises taking the magnitude (e.g. absolute value) of each component/element of the initial set of estimated channel information, and generating the enhanced set of estimated channel information by combining each magnitude with its corresponding phase from the set of estimated channel phases.

Figure 5:
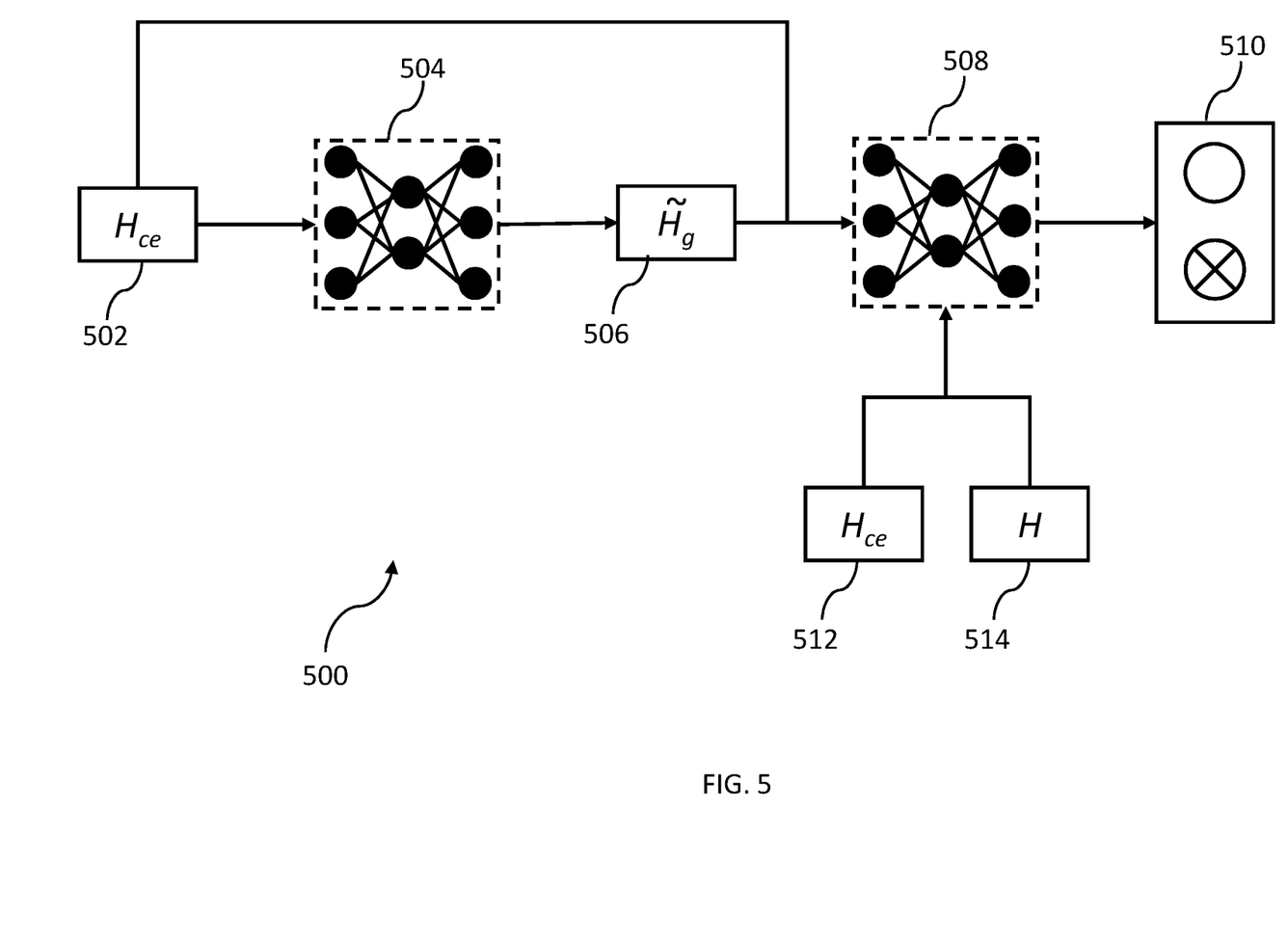
FIG. 5 shows an overview of an example method of training a machine-learning for use in channel estimation.

FIG. 5 shows an overview of an example method 500 of training a machine-learning model for use in channel estimation of a mixed-resolution system. The method may be performed by a computer. Once trained, the generator machine-learning model may be used as the first machine-learning model in the methods described above in relation to FIG. 3 and FIG. 4.

A first set of channel information 502 (also referred to herein as the "first input set of channel information"), $H_{ce}$, from a training dataset is input into a generator machine-learning model 504, which processes it to generate a set of estimated channel information 506, $\check{H}_g$. The first set of channel information 502 corresponds to measurements taken using high-resolution RF chains, as described above in relation to FIG. 3. The set of estimated channel information 506 corresponds to an estimate of channel information for both high-resolution RF chains and low-resolution RF chains. In other words, the generator machine-learning model 504 estimates channel information for all antenna elements and channels from information from the high-resolution RF chains.

Processing of the first set of channel information 502 by the generator machine-leaning model may proceed as described in relation to FIG. 3. The generator machine-learning model 504 may be a neural network, such as a convolutional neural network. Examples of such a network are described in relation to FIG. 7.

The first set of channel information 502 and the set of estimated channel information 506 are jointly input into a discriminator machine-learning model 508. The discriminator machine-learning model generates a classification 510 (herein also referred to as a "first classification") indicating whether the discriminator machine-learning model classifies the set of estimated channel information 506 as being "real" or "fake". The discriminator machine-learning model 508 may be a neural network, such as a convolutional neural network. Examples of such a network are described in relation to FIG. 8.

A further set of channel information 512 and a set of ground-truth channel information 514, H, taken from the training dataset are jointly input into the discriminator machine-learning model 508. The discriminator machine-learning model generates a classification 510 (herein also referred to as a "second classification") indicating whether the discriminator machine-learning model classifies the ground-truth channel information 506 as being real or fake. The further set of channel information 502 corresponds to measurements taken using high-resolution RF chains, as described above in relation to FIG. 3. The ground-truth set of estimated channel information 514 corresponds to high-resolution channel information for both high-resolution RF chains and low-resolution RF chains.

In some embodiments, the first set of channel information 304 and the set of ground-truth channel information 514 may each be normalised by their Frobenius norm, and then multiplied by a scaling factor to increase the range value of the channel coefficients without changing their statistical distribution. Alternatively or additionally, the first set of channel information 304 and the set of ground-truth channel information 514 may each be split into real and imaginary components prior to input into the first machine-leaning model. Such a split may be represented as a three-dimensional arrays, e.g. $H_{ce} \in \mathbb{R}^{M \times N_{sub} \times 2}$, $H \in \mathbb{R}^{M \times N_{sub} \times 2}$.

The first classification is used to update parameters of the generator machine-learning model 504. The second classification may also be used to update parameters of the generator machine-learning model 504. The parameter updates may be based on applying an optimisation routine to a generator objective function. For example, the parameter updates may be determined using stochastic gradient descent/ascent. The generator objective function has the objective of training the generator machine-learning model 504 to fool the discriminator machine-learning model 508 into classifying the sets of estimated channel information 506 as being real.

The first and second classifications are used to update parameters of the discriminator machine-learning model 504. The parameter updates may be based on applying an optimisation routine to a discriminator objective function. For example, the parameter updates may be determined using stochastic gradient descent/ascent. The generator objective function has the objective of training the discriminator machine-learning model 504 to correctly classifying sets of estimated channel information 506 as being fake, and sets of ground-truth data as being real.

In some embodiments, the parameter updates to the generator 504 and discriminator 508 machine-learning models are determined based on evaluating their respective objective functions over a batch of training data. For example, the parameter updates are determined after a plurality of input first set of channel information and further sets of channel information 512 have been classified by the discriminator machine-learning model, with the generator and discriminator objective functions for the iteration being evaluated based on the corresponding output classifications.

In some embodiments, the generator objective function and discriminator objective function are the same, with the goal of training being to minimise the objective function for the generator and maximise it for the discriminator (or vice versa). Examples of such an objective function include the minmax objective function and the Wasserstein loss, though it will be appreciated that other adversarial objective functions may alternatively be used. Effectively, the generator machine-learning model 504 and the discriminator machine-learning model 508 compete during training, with the generator machine-learning model 504 attempting to fool the discriminator into incorrectly classifying sets of estimated channel information 506 as being real.

The training method 500 may be iterated until a threshold condition is satisfied. The threshold condition may comprise a threshold number of training epochs and/or a threshold performance of the generator machine-learning model on a test dataset being reached.

The generator and discriminator machine-learning models are trained together in each training epoch. For testing, or inference, only the generator architecture is used.

Figure 6:
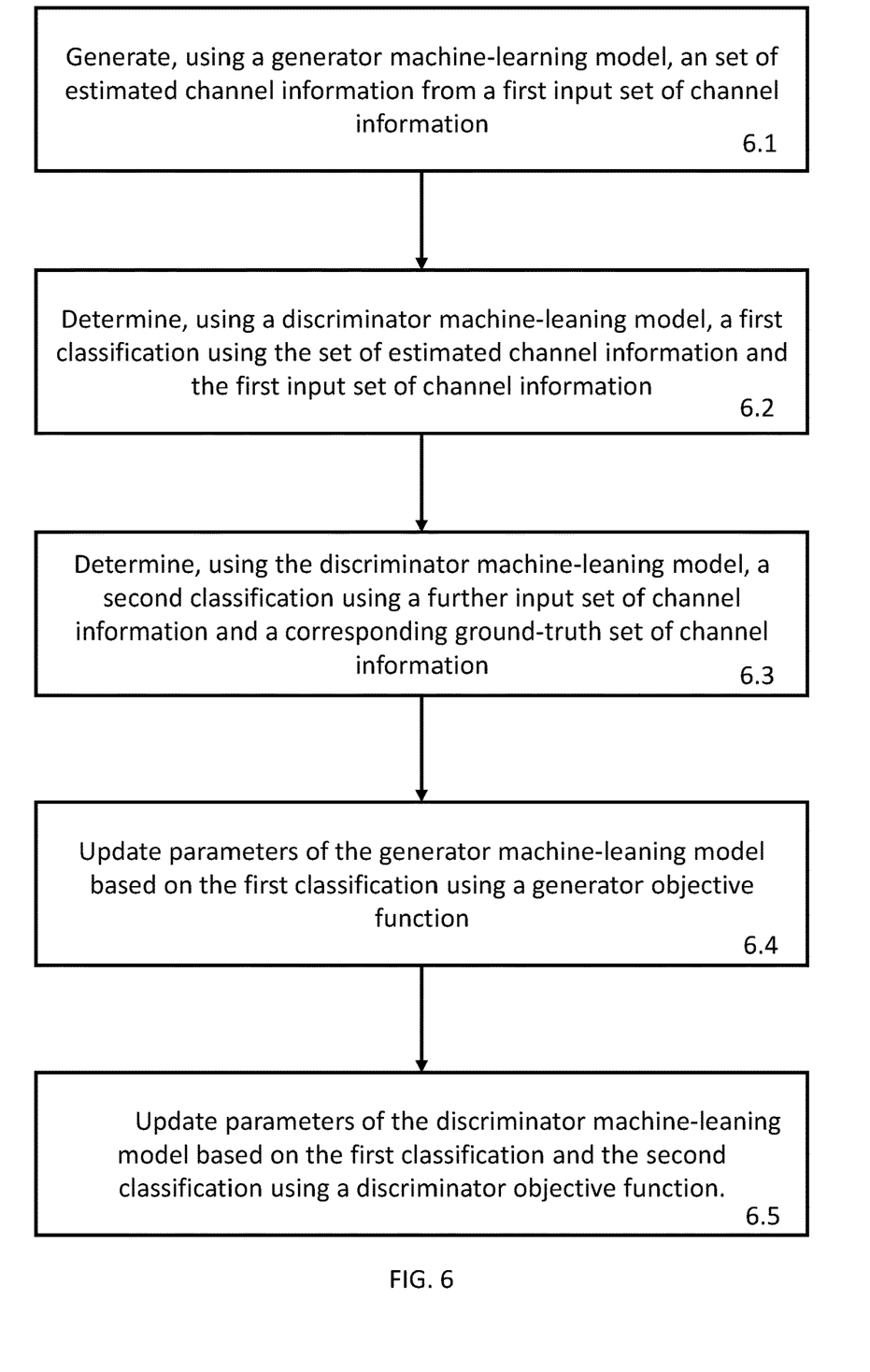
FIG. 6 shows a flow diagram of an example method of training a machine-learning model for use in channel estimation.

FIG. 6 shows a flow diagram of an example method of training a machine-learning model for use in channel estimation. The method corresponds to the method described in FIG. 5, and may be performed by a computer.

At operation 6.1, a generator machine-learning model is used to generate a set of estimated channel information from a first input set of channel information. The first input set of channel information corresponds to a plurality of high-resolution radio-frequency chains. The estimated set of channel information corresponds to the plurality of high-resolution radio-frequency chains and a plurality of low-resolution radio-frequency chains, i.e. corresponds to an estimate of channel information of all RF chains in a multi-resolution system.

The generator machine-learning model may be a neural network configured to take the first input set of channel information as input, and processes it through a plurality of neural network layers based on current values of parameters of the generator machine learning-model to generate the estimated set of channel information.

At operation 6.2, a discriminator machine-leaning model is used to determine a first classification using the set of estimated channel information and the first input set of channel information. The first classification is an indication of whether the discriminator machine-learning model classifies the set of estimated channel information as being real or fake based on the current values of the parameters of the discriminator machine-learning model.

At operation 6.3, the discriminator machine-leaning model is used to determine a second classification using a further input set of channel information and a corresponding ground-truth set of channel information. The further input set of channel information corresponds to a plurality of high-resolution radio-frequency chains. The corresponding ground-truth set of channel information corresponds to the plurality of high-resolution radio-frequency chains and the plurality of low-resolution radio-frequency chains. The ground-truth set of channel information may be based on high-resolution measurements of all antenna elements in an antenna array.

At operation 6.4, parameters of the generator machine-leaning model are update based on the first classification using a generator objective function.

At operation 6.5, parameters of the discriminator machine-leaning model are updated based on the first classification and the second classification using a discriminator objective function.

The generator objective function and the discriminator objective function may having competing objectives. The generator objective function and the discriminator objective function may be the same function, but the generator parameter updates may be determined with the goal of minimising the function and the discriminator parameter updates may be determined with the goal of maximising the function (or vice versa).

An optimisation routine may be used to determine the parameter updates. For example, stochastic gradient descent/ascent may be applied to determine the parameter updates. Many other type of optimisation routine will be apparent to those skilled in the art.

Operations 6.1 to 6.5 may be iterated over a set of training data until a threshold condition is satisfied.

Figure 7:
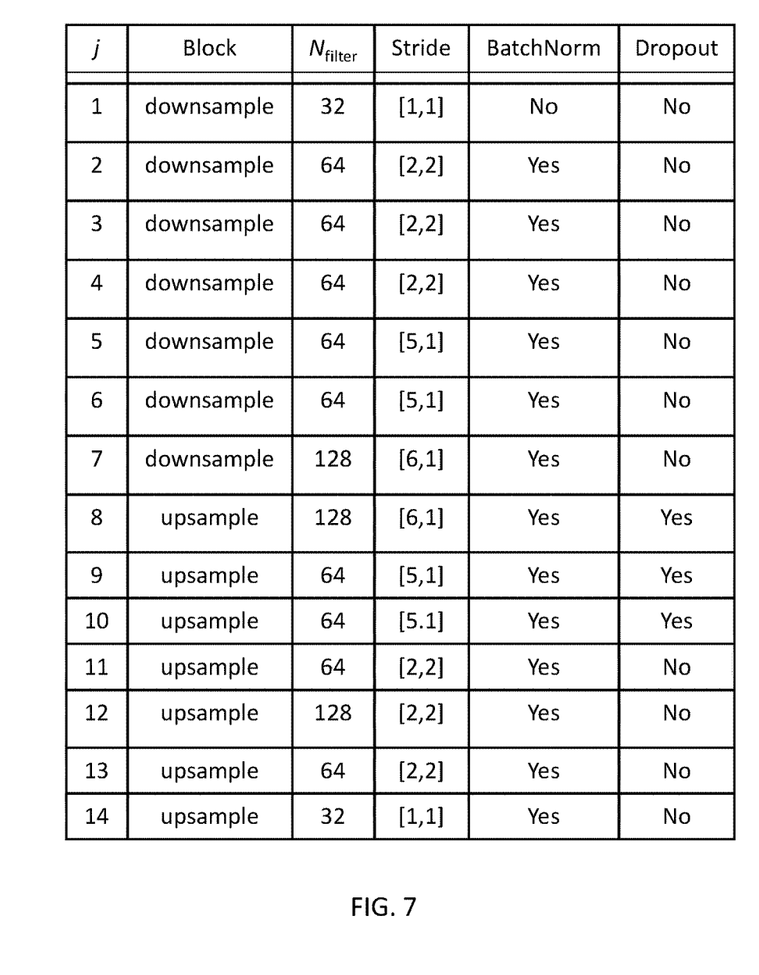
FIG. 7 shows an example structure of a machine-learning model.

FIG. 7 shows an example structure of a machine-learning model. This machine-learning model is an example of a neural network that may be used as the first machine-learning model in FIG. 3 or 4, and/or the generator machine-learning model in FIG. 5 or 6. In the following, it will be referred to as a "generator neural network".

In general, the generator neural network may be a convolutional neural network, i.e. a neural network comprising one or more convolutional layers.

The generator neural network may comprise a plurality of down-sampling blocks. Each down-sampling block is configured to reduce the dimension of its input. Each down-sampling block may comprise a convolutional two-dimensional layer (Conv2D) and a leaky rectifier linear unit (LeakyReLU) activation function. One or more of the down-sampling blocks may further comprise a batch-normalisation layer (BatchNorm). Each Conv2D layer is defined by a number of convolutional filters, $N_{filters}$, in the layer and a stride.

In the example shown, the first seven blocks of the generator neural network are down-sampling blocks, with all but the first block having a BatchNorm layer. The plurality of down-sampling blocks may collectively be referred to as an "encoder block". The initial down-sampling block has 32 filters and a stride of [1,1], where the stride is given in the horizontal and vertical directions. Blocks 2-6 each have 64 filters, with blocks 2-4 having a stride of [2,2] and blocks 5-6 having a stride of [5,1]. The final down-sampling block has 128 filters and a stride of [6,1]. All down-sampling blocks except the first have a BatchNorm layer. None of the down-sampling blocks has any dropout.

The generator neural network may comprise a plurality of up-sampling blocks. In some embodiments, the plurality of up-sampling blocks follow the plurality of down-sampling blocks, giving the generator neural network a similar structure to an auto-encoder. The plurality of down-sampling blocks may thus collectively be referred to as a "decoder block". Each up-sampling block is configured to increase the dimension of its input. Each up-sampling block comprises a transposed convolutional two-dimensional layer (Conv2DT), followed by a BatchNorm layer and rectifier linear unit (ReLU) as activation function. Each Conv2DT layer is defined by a number of convolutional filters, $N_{filters}$, in the layer and a stride.

In the example shown, the final seven blocks (blocks 7-14) of the generator neural network are up-sampling blocks. The first up-sampling block (block 8) comprises 128 filters, and has a stride of [6,1]. Blocks 9-11 each have 64 filters, with blocks 9 and 10 having a stride of [5,1] and block 11 having a stride of [2,2]. Blocks 8-10 may include dropouts. Block 12 has 128 filters and block 13 has 64 filters, with both having a stride of [2,2]. The final block (block 14) has 32 filters and a stride of [1,1].

The generator neural network may comprise one or more skip connections. Each skip connection takes the output of one block of the generator neural network and provides it as input to a subsequent block that is not the immediately following block. In other words, a block j with a skip connection provides its output to both the next block, j+1, and another block, j+n (n>1), in the generator neural network. In some embodiments, the one or more skip connections are between a down-sampling block in the encoder block and an up-sampling block in the decoder block. Those block interconnections provide more information to the decoder block. In some embodiments, the one or more skip connections are each between a down-sampling block j in the encoder block and a corresponding up-sampling block $N_b$-j in the decoder block, where $N_b$ is the total number of blocks in the generator neural network and j=[1: $N_b$].

Figure 8:
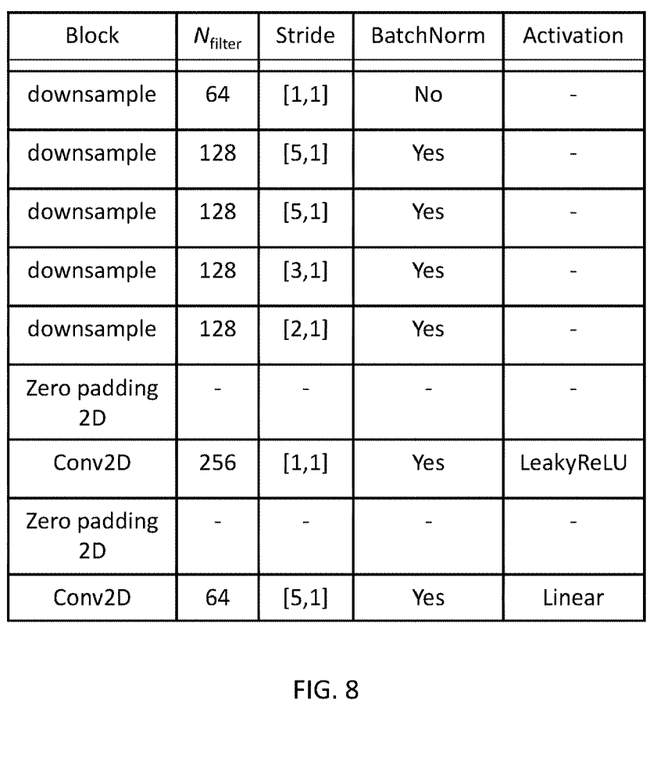
FIG. 8 shows a further example structure of a machine-learning model

FIG. 8 shows an example structure of a further machine-learning model. This machine-learning model is an example of a neural network that may be used as the discriminator machine-learning model in FIG. 5 or 6. In the following, it will be referred to as a "discriminator neural network".

In general, the discriminator neural network may be a convolutional neural network, i.e. a neural network comprising one or more convolutional layers.

The discriminator neural network may comprise a plurality of down-sampling blocks. Each down-sampling block is configured to reduce the dimension of its input. Each down-sampling block may comprise a convolutional two-dimensional layer (Conv2D) and may be associated with an activation function. One or more of the down-sampling blocks may further comprise a batch-normalisation layer (BatchNorm). Each Conv2D layer is defined by a number of convolutional filters, $N_{filters}$, in the layer and a stride. The discriminator neural network may further comprise one or more zero padding layers.

In the example shown, the first five blocks of the discriminator neural network are down-sampling blocks. The first down-sampling block has 64 filters, a stride of [1,1] and no BatchNorm layer. The following four down-sampling blocks each have 128 filters and a BatchNorm layer. Blocks 2 and 3 have a stride of [5,1], block 4 has a stride of [3,1] and block 5 has stride of [2,1]. None of the first five blocks are associated with an activation function.

The sixth block of the discriminator neural network is a zero padding layer, which is followed by a convolutional block in block seven. The convolutional block has 256 convolutional filters and a stride of [1,1]. It further comprises a BatchNorm layer and is associated with a LeakyReLU activation function. The eighth block is a further zero-padding layer. The final block of the discriminator neural network is a convolutional block with a single convolutional filter and stride [1,1]. It is associated with a linear activation function.

The second machine-learning model of FIGS. 3 and 4 may be a long short-term memory (LSTM) model. The LSTM may comprise one or more LSTM layers, each having a number of filters, $N_{filter}$, and being associated with an activation function (e.g. a hyperbolic tangent activation function or a linear activation function). One or more of the LSTM layers may have return sequences.

In some embodiments, the LSTM may comprise two LSTM layers. The first layer may have ten filters and a hyperbolic tangent activation function. It may have return sequences. The second layer may have a single filter and a linear activation function. It may also have return sequences. It will be appreciated that any other LSTM (or recurrent neural network) structures may alternatively be used.

The LSTM may be trained using supervised learning, with inputs and labels determined using the method described in relation to the pre-processing used in FIG. 3. The objective of the LSTM is to improve the phase signal estimation in the full resolution time domain. Each antenna element phase signal may be optimised separately.

Figure 9:
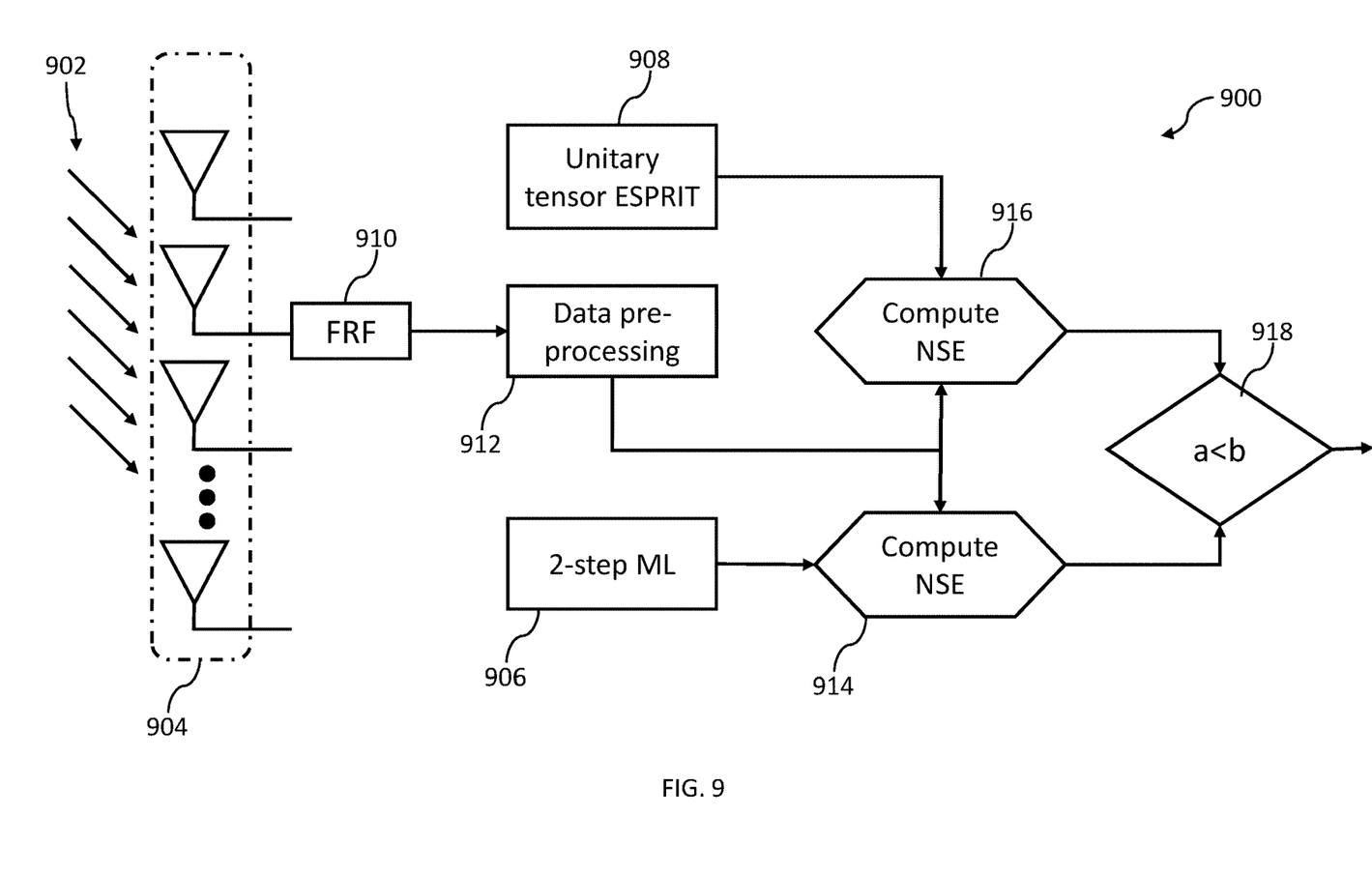
FIG. 9 shows a schematic overview of a further method of channel estimation for a mixed-resolution system.

FIG. 9 shows an example of a schematic overview of a further method 900 of channel estimation for a mixed-resolution system. The method 900 may be performed by a computer.

The method 900 combines the two-stage machine-learning approach of FIGS. 3 and 4 with one or more other channel estimation methods, such as unitary tensor ESPIRIT, in order to provide flexibility in the channel estimation method used. One or more RF signals 902 are received at a mixed resolution antenna array 904, which processes the received signal through a plurality of RF chains, for example as described in relation to FIG. 2. A two-stage machine-learning method 906 is applied to the processed signals, for example as described in relation to FIGS. 3 and 4. An alternative channel estimation method 908, such as unitary tensor ESPIRIT, is also applied to the processed signals. Many other examples of alternative channel estimation methods may alternatively be used. For example, iterative parameter estimation schemes based on the state alternating expectation maximization (SAGE) method, which then estimate multipath component parameters, may alternatively be used.

A high-resolution RF chain 910 performs a further measurement (a "reference measurement") on an antenna element that was previously connected to a low-resolution RF chain. This full resolution measurement may be pre-processed 912, for example using the pre-processing method described in relation to FIG. 3. A first error 914, a, (also referred to herein as a "first error value") is calculated between the reference measurement and estimated channel for the antenna element obtained from the two-stage machine-learning method 906. A second error 916, b, (also referred to herein as a "second error value") is calculated between the reference measurement and estimated channel for the antenna element obtained from the alternative channel estimation method 908. The first error 914 is compared 918 to the second error 916. If the first error 914 is smaller than the second error 916, the channel estimate from the two-stage machine-learning model 906 is output for use. If the first error 914 is larger than the second error 916, the channel estimate from the alternative channel estimation method 908 is output for use.

In some embodiments, the first error 912 and second error 914 may be a normalised square error (NSE). The NSE may be given by:

$$NSE = \frac{\|c - \tilde{c}\|^2}{\|c\|^2} \quad (4)$$

where c is the reference measurement, and $\tilde{c}$ is the estimated channel for the same antenna element.

Figure 10:
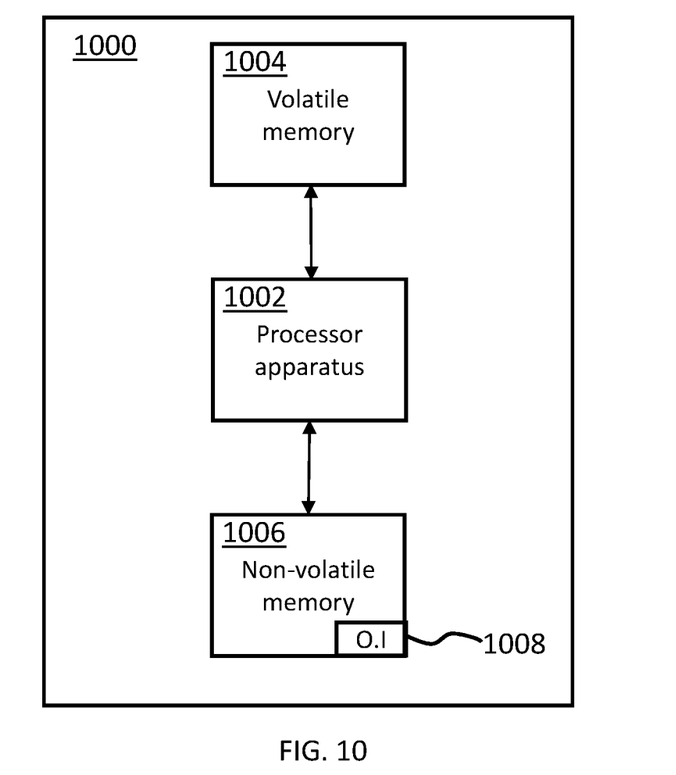
FIG. 10 shows a schematic example of a system/apparatus for performing any of the methods described herein.

FIG. 10 shows a schematic example of a system/apparatus 1000 for performing any of the methods described herein. The system/apparatus shown is an example of a computing device. It will be appreciated by the skilled person that other types of computing devices/systems may alternatively be used to implement the methods described herein, such as a distributed computing system.

The apparatus (or system) 1000 comprises one or more processors 1002. The one or more processors control operation of other components of the system/apparatus 1000. The one or more processors 1002 may, for example, comprise a general-purpose processor. The one or more processors 1002 may be a single core device or a multiple core device. The one or more processors 1002 may comprise a Central Processing Unit (CPU) or a graphical processing unit (GPU). Alternatively, the one or more processors 1002 may comprise specialised processing hardware, for instance a RISC processor or programmable hardware with embedded firmware. Multiple processors may be included.

The system/apparatus comprises a working or volatile memory 1004. The one or more processors may access the volatile memory 1004 in order to process data and may control the storage of data in memory. The volatile memory 1004 may comprise RAM of any type, for example, Static RAM (SRAM) or Dynamic RAM (DRAM), or it may comprise Flash memory, such as an SD-Card.

The system/apparatus comprises a non-volatile memory 1006. The non-volatile memory 1006 stores a set of operation instructions 1008 for controlling the operation of the processors 1002 in the form of computer readable instructions. The non-volatile memory 1006 may be a memory of any kind such as a Read Only Memory (ROM), a Flash memory or a magnetic drive memory.

The one or more processors 1002 are configured to execute operating instructions 1008 to cause the system/apparatus to perform any of the methods described herein. The operating instructions 1008 may comprise code (i.e. drivers) relating to the hardware components of the system/apparatus 1000, as well as code relating to the basic operation of the system/apparatus 1000. Generally speaking, the one or more processors 1002 execute one or more instructions of the operating instructions 1008, which are stored permanently or semi-permanently in the non-volatile memory 1006, using the volatile memory 1004 to store temporarily data generated during execution of said operating instructions 1008.

Figure 11:
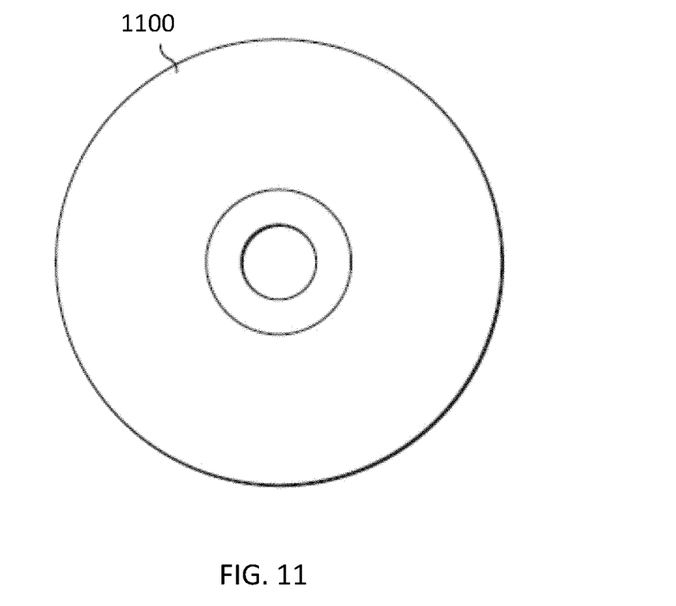
FIG. 11 shows a non-transitory media according to some embodiments.

FIG. 11 shows a non-transitory media 1100 according to some embodiments. The non-transitory media 1100 is a computer readable storage medium. It may be e.g. a CD, a DVD, a USB stick, a blue ray disk, etc. The non-transitory media 1100 stores computer program code causing an apparatus to perform operations described above when executed by a processor such as processor 1002 of FIG. 10.

Any mentioned apparatus and/or other features of particular mentioned apparatus may be provided by apparatus arranged such that they become configured to carry out the desired operations only when enabled, e.g. switched on, or the like. In such cases, they may not necessarily have the appropriate software loaded into the active memory in the non-enabled (e.g. switched off state) and only load the appropriate software in the enabled (e.g. on state). The apparatus may comprise hardware circuitry and/or firmware. The apparatus may comprise software loaded onto memory. Such software/computer programs may be recorded on the same memory/processor/functional units and/or on one or more memories/processors/functional units.

Any mentioned apparatus/circuitry/elements/processor may have other functions in addition to the mentioned functions, and that these functions may be performed by the same apparatus/circuitry/elements/processor. One or more disclosed aspects may encompass the electronic distribution of associated computer programs and computer programs (which may be source/transport encoded) recorded on an appropriate carrier (e.g. memory, signal).

Any "computer" described herein can comprise a collection of one or more individual processors/processing elements that may or may not be located on the same circuit board, or the same region/position of a circuit board or even the same device. In some examples one or more of any mentioned processors may be distributed over a plurality of devices. The same or different processor/processing elements may perform one or more functions described herein.

The term "signalling" may refer to one or more signals transmitted as a series of transmitted and/or received electrical/optical signals. The series of signals may comprise one, two, three, four or even more individual signal components or distinct signals to make up said signalling. Some or all of these individual signals may be transmitted/received by wireless or wired communication simultaneously, in sequence, and/or such that they temporally overlap one another.

With reference to any discussion of any mentioned computer and/or processor and memory (e.g. including ROM, CD-ROM etc.), these may comprise a computer processor, Application Specific Integrated Circuit (ASIC), field-programmable gate array (FPGA), and/or other hardware components that have been programmed in such a way to carry out the inventive function.

The applicant hereby discloses in isolation each individual feature described herein and any combination of two or more such features, to the extent that such features or combinations are capable of being carried out based on the present specification as a whole, in the light of the common general knowledge of a person skilled in the art, irrespective of whether such features or combinations of features solve any problems disclosed herein, and without limitation to the scope of the claims. The applicant indicates that the disclosed aspects/examples may consist of any such individual feature or combination of features. In view of the foregoing description it will be evident to a person skilled in the art that various modifications may be made within the scope of the disclosure.

While there have been shown and described and pointed out fundamental novel features as applied to examples thereof, it will be understood that various omissions and substitutions and changes in the form and details of the devices and methods described may be made by those skilled in the art without departing from the scope of the disclosure. For example, it is expressly intended that all combinations of those elements and/or method steps which perform substantially the same function in substantially the same way to achieve the same results are within the scope of the disclosure. Moreover, it should be recognized that structures and/or elements and/or method steps shown and/or described in connection with any disclosed form or examples may be incorporated in any other disclosed or described or suggested form or example as a general matter of design choice. Furthermore, in the claims means-plus-function clauses are intended to cover the structures described herein as performing the recited function and not only structural equivalents, but also equivalent structures.

The invention claimed is:

1. A method comprising:
    generating, using a first machine-learning model, an initial set of estimated channel information from a first input set of channel information obtained from a set of radio-frequency signals, wherein the first input set of channel information corresponds to measurements from a first plurality of radio-frequency chains, and wherein the estimated set of channel information corresponds to the first plurality of radio-frequency chains and a second plurality of radio-frequency chains;
    generating, using a second machine-learning model, a set of estimated channel phases from the initial set of estimated channel information and a second input set of channel information, wherein the second set of input channel information corresponds to measurements from the second plurality of radio-frequency chains; and
    combining the initial set of estimated channel information and the set of estimated channel phases to generate an enhanced set of estimated channel information, wherein the enhanced set of estimated channel information corresponds to the first plurality of radio-frequency chains and the second plurality of radio-frequency chains.

2. The method of claim 1, wherein the first plurality of radio frequency chains comprises a plurality of high-resolution radio frequency chains, and the second plurality of radio frequency chains comprises a plurality of low-resolution radio frequency chains.

3. The method of claim 2, wherein the first machine-learning model is a neural network comprising one or more convolutional layers.

4. The method of claim 1, wherein the first machine-learning model comprises a plurality of down-sampling blocks followed with a plurality of up-sampling blocks.

5. The method of claim 4, wherein the first machine-learning model comprises one or more skip-connections, the skip connection being between a down-sampling block and a corresponding up-sampling block.

6. The method of claim 1, wherein the second machine-learning model is a long short-term memory model.

7. The method of claim 6, wherein the initial set of estimated channel information is converted to time domain information prior to input into the long short-term memory model.

8. The method of claim 1, wherein the second input set of channel information comprises estimated phases corresponding to the second plurality of radio-frequency chains, and wherein generating the set of estimated channel phases comprises:
    determining further phase information from the initial set of estimated channel information; and
    inputting the estimated phases corresponding to the second plurality of radio-frequency chains and the further phase information to the second machine-learning model.

9. The method of claim 1, wherein combining the initial set of estimated channel information and the set of estimated channel phases to generate an enhanced set of estimated channel information comprises:
    combining the estimated channel phase with an absolute value of a corresponding element of the initial set of estimated channel information.

10. The method of claim 1, further comprising:
    determining an additional set of channel information from the initial set of estimated channel information and the second input set of channel information using an alternative channel estimation method;
    receiving further channel information corresponding to a measurement of an antenna element associated with a constrained-resolution radio-frequency chain, wherein the further channel information has been measured using a high-resolution radio-frequency chain;
    determining a first error value, the first error value comparing the further channel information to a corresponding element of channel information in the enhanced set of estimated channel information;
    determining a second error value, the second error value comparing the further channel information to a corresponding element of channel information in the additional set of channel information; and
    if the first error is lower than the second error, outputting the enhanced set of estimated channel information.

11. A non-transitory program storage device readable with an apparatus, tangibly embodying a program of instructions executable with the apparatus for performing the method of claim 1.

12. A base station, comprising:
a plurality of high-resolution radio frequency chains;
a plurality of low-resolution radio frequency chains;
one or more processors; and
one or more non transitory memories storing instructions that, when executed with the one or more processors, cause the base station to perform:
- generating, using a first machine-learning model, an initial set of estimated channel information from a first input set of channel information obtained from a set of radio-frequency signals, wherein the first input set of channel information corresponds to measurements from a first plurality of radio-frequency chains, and wherein the estimated set of channel information corresponds to the first plurality of radio-frequency chains and a second plurality of radio-frequency chains;
- generating, using a second machine-learning model, a set of estimated channel phases from the initial set of estimated channel information and a second input set of channel information, wherein the second set of input channel information corresponds to measurements from the second plurality of radio-frequency chains; and
- combining the initial set of estimated channel information and the set of estimated channel phases to generate an enhanced set of estimated channel information, wherein the enhanced set of estimated channel information corresponds to the first plurality of radio-frequency chains and the second plurality of radio-frequency chains.

* * * * *